US012687523B2

(12) United States Patent
Rehman et al.

(10) Patent No.: US 12,687,523 B2
(45) Date of Patent: Jul. 21, 2026

(54) ULTRASONIC IN-LINE INSPECTION SYSTEM WITH SQUARE TRANSDUCERS

(71) Applicant: Saudi Arabian Oil Company, Dhahran (SA)

(72) Inventors: Aziz U. Rehman, Edmonton (CA); Isa H. Al-Mudaibegh, Dammam (SA); Naif A. Al-Sufyani, Al Khobar (SA); Ahmed F. Al-Rashidi, Khobar (SA); Yasser S. Al-Subhi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 199 days.

(21) Appl. No.: 18/456,131

(22) Filed: Aug. 25, 2023

(65) Prior Publication Data

US 2025/0067708 A1 Feb. 27, 2025

(51) Int. Cl.
*G01N 29/265* (2006.01)
*G01N 29/04* (2006.01)
G01N 29/44 (2006.01)

(52) U.S. Cl.
CPC ......... *G01N 29/265* (2013.01); *G01N 29/449* (2013.01); *G01N 2291/105* (2013.01); *G01N 2291/2636* (2013.01)

(58) Field of Classification Search
CPC .............. G01N 29/265; G01N 29/449; G01N 2291/105; G01N 2291/2636; G01N 29/043
See application file for complete search history.

(56) References Cited

U.S. PATENT DOCUMENTS

| | | | |
|---|---|---|---|
| 3,346,508 A | 10/1967 | Thompson | |
| 3,622,825 A | 11/1971 | Bennett | |
| 3,971,962 A | 7/1976 | Green | |
| 4,265,121 A | 5/1981 | Cribbs | |

(Continued)

FOREIGN PATENT DOCUMENTS

| | | |
|---|---|---|
| CA | 2763427 | 12/2010 |
| CN | 107843649 | 3/2018 |

(Continued)

OTHER PUBLICATIONS

[No Author Listed], "Ultrasonic Crack Detection," Pipecare, Innovative Solutions, 2021, 7 pages.

(Continued)

*Primary Examiner* — Laura Martin
*Assistant Examiner* — Anthony W Megna Fuentes
(74) *Attorney, Agent, or Firm* — Fish & Richardson P.C.

(57) ABSTRACT

Ultrasonic pipeline crack inspection systems and methods can include a housing with an elongate body; a plurality of slots on a circumferential surface of the elongate body; and a plurality of square cross-section ultrasonic transducers (UTs) positioned in the corresponding the plurality of slots. A controller operatively coupled to the plurality of square cross-section UTs causes each UT of the plurality of square cross-section UTs to transmit a respective ultrasonic beam through the fluid flowed through the pipeline towards a wall of the pipeline, to receive a respective reflection of each ultrasonic beam transmitted by each square cross-section UT, and to process respective ultrasonic beam and each respective reflection of each ultrasonic beam to analyze a crack in the wall of the pipeline.

13 Claims, 4 Drawing Sheets

(56) References Cited

U.S. PATENT DOCUMENTS

| | | | |
|---|---|---|---|
| 4,467,237 A | 8/1984 | Piaget et al. | |
| 4,473,921 A | 10/1984 | Weber et al. | |
| 4,597,874 A | 7/1986 | Francis | |
| 4,641,529 A | 2/1987 | Lorenzi et al. | |
| 4,870,278 A | 9/1989 | Leonardi-Cattolica et al. | |
| 4,964,059 A | 10/1990 | Sugaya et al. | |
| 5,219,471 A | 6/1993 | Goual et al. | |
| 5,340,477 A | 8/1994 | Simon | |
| 5,460,046 A | 10/1995 | Maltby et al. | |
| 5,497,662 A * | 3/1996 | Dykes | G01N 29/07 |
| | | | 73/598 |
| 6,110,352 A | 8/2000 | Su et al. | |
| 6,220,099 B1 | 4/2001 | Marti | |
| 6,379,304 B1 | 4/2002 | Gilbert | |
| 6,388,439 B1 | 5/2002 | Lembeye | |
| 6,783,493 B2 | 8/2004 | Chiang | |
| 7,231,331 B2 | 6/2007 | Davis | |
| 7,234,335 B2 | 6/2007 | Lolli | |
| 7,617,603 B2 | 11/2009 | Coleman et al. | |
| 7,705,058 B2 | 4/2010 | Coutinho et al. | |
| 7,706,988 B2 | 4/2010 | McNealy et al. | |
| 7,798,023 B1 | 9/2010 | Hoyt et al. | |
| 8,079,263 B2 | 12/2011 | Randall et al. | |
| 8,201,454 B2 | 6/2012 | Paige | |
| 8,215,174 B2 | 7/2012 | Cain, Jr. | |
| 8,468,889 B2 | 6/2013 | Schubert et al. | |
| 8,738,339 B2 | 5/2014 | Richard et al. | |
| 8,888,706 B2 | 11/2014 | Chen et al. | |
| 9,063,059 B2 | 6/2015 | Na et al. | |
| 9,086,354 B2 | 7/2015 | Al-Sahan et al. | |
| 9,181,499 B2 | 11/2015 | Mason et al. | |
| 9,335,302 B2 | 5/2016 | Oberdoerfer et al. | |
| 9,526,475 B2 | 12/2016 | Specht et al. | |
| 9,782,693 B2 | 10/2017 | Evanovich et al. | |
| 9,804,132 B2 | 10/2017 | Hoyt | |
| 10,060,567 B2 | 8/2018 | Van Nie et al. | |
| 10,458,822 B2 | 10/2019 | Pirner | |
| 10,527,588 B2 | 1/2020 | Torichigai et al. | |
| 10,845,343 B2 | 11/2020 | Davis | |
| 10,921,286 B2 | 2/2021 | Boenisch | |
| 11,090,580 B2 | 8/2021 | Al-Jundi et al. | |
| 11,221,314 B2 | 1/2022 | Sutherland et al. | |
| 2003/0136195 A1 | 7/2003 | Krieg et al. | |
| 2004/0015079 A1 | 1/2004 | Berger et al. | |
| 2005/0150842 A1 | 7/2005 | Puik | |
| 2007/0239968 A1 | 10/2007 | Moyer et al. | |
| 2008/0178679 A1 | 7/2008 | Hirao et al. | |
| 2008/0184784 A1 | 8/2008 | Dam | |
| 2009/0084184 A1* | 4/2009 | Dijkstra | G01N 29/265 |
| | | | 73/623 |
| 2012/0017998 A1 | 1/2012 | Al-Sahan et al. | |
| 2014/0191135 A1 | 7/2014 | Partington et al. | |
| 2014/0202929 A1 | 7/2014 | Mason et al. | |
| 2015/0080727 A1 | 3/2015 | Specht et al. | |
| 2015/0345987 A1 | 12/2015 | Hajati | |
| 2016/0327419 A1 | 11/2016 | Hellevang et al. | |
| 2020/0371068 A1 | 11/2020 | Rehman et al. | |
| 2021/0039017 A1 | 2/2021 | Al-Jundi et al. | |
| 2022/0011099 A1 | 1/2022 | Inoh | |
| 2023/0049260 A1 | 2/2023 | Bouaoua | |
| 2023/0061122 A1 | 3/2023 | Rehman et al. | |
| 2024/0019086 A1 | 1/2024 | Pirsiavash | |
| 2024/0219349 A1 | 7/2024 | Akl et al. | |

FOREIGN PATENT DOCUMENTS

| | | | |
|---|---|---|---|
| DE | 112016005038 T5 | 8/2018 | |
| EP | 304053 | 2/1989 | |
| GB | 860194 | 2/1961 | |
| JP | S56155848 | 12/1981 | |
| JP | H 08188151 | 7/1996 | |
| JP | H1183817 | 3/1999 | |
| JP | 2013170845 | 9/2013 | |
| JP | 6262837 B2 | 1/2018 | |
| WO | WO 199931499 | 6/1999 | |
| WO | WO-2008010711 A1 * | 1/2008 | B06B 1/0633 |
| WO | WO-2021243456 A1 * | 12/2021 | F16L 55/44 |

OTHER PUBLICATIONS

Barbian et al., "In-Line Inspection of High Pressure Transmission Pipelines: State-of-the-Art and Future Trends," 18th World Conference on Nondestructive Testing, Durban, South Africa, Apr. 16-20, 2012, 21 pages.

Beller et al., "Combined In-Line Inspection of Pipelines for Metal Loss and Cracks," ECNDT 2006, 13 pages.

imasonic.com [online], "Immersion Circular Element Transducer," available on or before Sep. 20, 2020, via Internet Archive: Wayback Machine URL<https://web.archive.org/web/20230000000000*/ https://www.imasonic.com/industry/online-design/>, retrieved on May 3, 2024, (https://www.imasonic.com/industry/online-design/), 2 pages.

Kachanov et al., "Requirements for Choosing the Parameters of Broadband Transducers for Testing Objects with High Damping of Ultrasonic Signals," Russian Journal of Nondestructive Testing, 2007, 43(11):743-754, 12 pages.

ccj-online.com [online], "HRSG Inspection Tools," available on or before Feb. 25, 2019, retrieved on May 22, 2019, retrieved from URL <www.ccj-online.com/wp-content/uploads/gravity_forms/3-b246f63cf9a9ff5af247a3db291cb13f/2016/05/HRSG-NDT-Brochure. pdf>, 8 pages.

Chen et al., "Broadband Focusing Ultrasonic Transducers Based on Dimpled LiNbO3 Plate With Inversion Layer," IEEE Transactions on Ultrasonics, Ferroelectrics, and Frequency Control, Dec. 2012, 59(12), 6 pages.

Ginzel et al., "Automated Ultrasonic Inspection of Nozzle Welds using Phased-Array Ultrasonic Testing, Part 2—Outside Access," Simulation in NDT, Online Workshop in www.ndt.net, Sep. 2010, 13 pages.

Moles et al., "Ultrasonic inspection of pressure vessel construction welds using phased arrays," R/D Tech, 3rd MENDT—Middle East Nondestructive Testing Conference & Exhibition, Nov. 2005, 23 pages.

Moles et al., "Construction Weld Testing Procedures Using Ultrasonic Phased Arrays," From Materials Evaluation, The American Society for Nondestructive Testing, Inc., 2005, 63(1): 27-33, 7 pages.

Otzisk, "Oil/Water Separation Technologies," Digital Refining—Process, Operation and Maintenance, retrieved from URL <https:// www.digitalrefining.com/article/1000798,Oil_water_separation_ technologies.html#.XQvzHGCWxiU>, Apr. 2013, 2 pages.

Padron, "System and Method for Separation of Crude or Hydrocarbon Free and/or Disperse water," SPE Production, Exploration and Upgrading PDVSA SA, SPE-71468, 2001 SPE Annual Conference and Exhibition in New Orleans, Louisiana, Sep. 30-Oct. 3, 2001, 7 pages.

Pekdemir et al., "Emulsification of Crude Oil-Water Systems using Biosurfactants," Transactions of IChemE, Part B, Process Safety and Environmental Protection, vol. 83, B1, Jan. 2005, 10 pages.

slb.com [online], "EPF Crude Oil Treatment," retrieved from URL <https://www.slb.com/~/media/Files/testing/other/epf_crude_oil_ treatment.pdf>, available on or before Feb. 25, 2019, 1 page.

Sun et al., "Real-Time, Label-Free Detection of Biomolecular Interactions in Sandwich Assays by the Oblique-Incidence Reflectivity Difference Technique," Sensors, Dec. 2014, 14: 23307-23320, 14 pages.

Swanekamp, "HRSG Inspectors," Power Engineering, retrieved from URL <https://www.power-eng.com/articles/print/volume-110/ issue-10/features/hrsg-inspections.html>, retrieved on May 22, 2019, published Oct. 1, 2006, 8 pages.

testex-ndt.com [online], "HRSG Inspections, " available on or before Mar. 18, 2016, via the Wayback Machine URL <https://web. archive.org/web/20160318001332/https://testex-ndt.com/services/ hrsg-inspections/>, retrieved on May 22, 2019, retrieved from URL <https://testex-ndt.com/services/hrsg-inspections/>, 6 pages.

(56)         References Cited

OTHER PUBLICATIONS

Twomey, Inspection Techniques for Detecting Corrosion Under Insulation, NDT Net., vol. 3, No. 2, retrieved from URL <www.ndt.net/article/0298/twomey/twomey.htm>, Feb. 1998, 6 pages.
ndt-global.com [online], Pulse Echo Crack, 2024, retrieved on May 3, 2024, retrieved from URL<https://www.ndt-global.com/technologies/pulse-echo-crack/>, 6 pages.
Triger et al., "MOSAIC An Integrated Ultrasonic 2D Array System. Simon Triger," IEEE International Ultrasonics Symposium, Oct. 28-31, 2007, New York, United States, Apr. 30, 20081021-1024, 5 pages.
PCT International Search Report and Written Opinion in International Appln. No. PCT/US2022/075351, dated Nov. 4, 2022, 14 pages.
International Search Report and Written Opinion in International Appln. No. PCT/US2025/037767, mailed on Nov. 14, 2025, 17 pages.

* cited by examiner

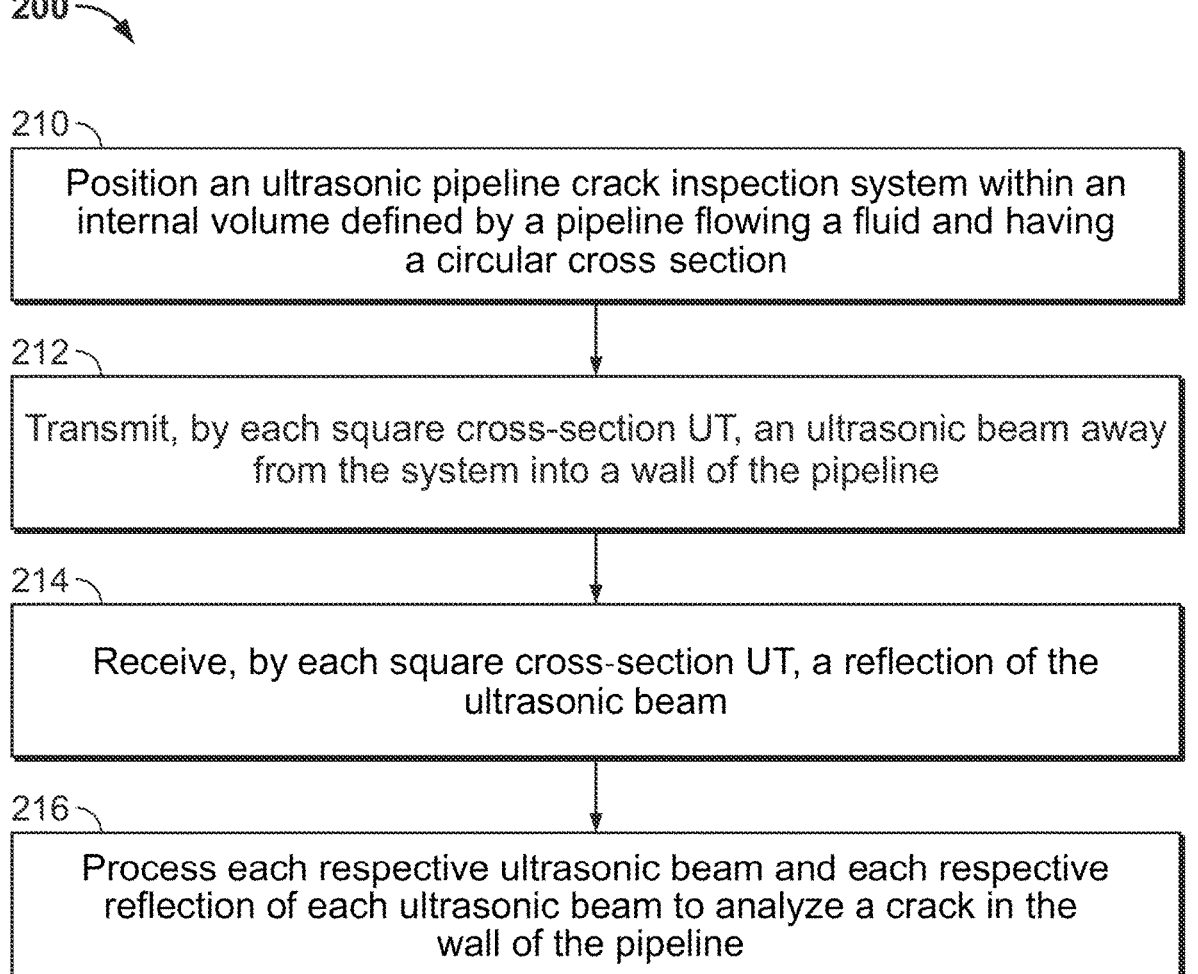

200

210

Position an ultrasonic pipeline crack inspection system within an internal volume defined by a pipeline flowing a fluid and having a circular cross section

212

Transmit, by each square cross-section UT, an ultrasonic beam away from the system into a wall of the pipeline

214

Receive, by each square cross-section UT, a reflection of the ultrasonic beam

216

Process each respective ultrasonic beam and each respective reflection of each ultrasonic beam to analyze a crack in the wall of the pipeline

FIG. 6

ULTRASONIC IN-LINE INSPECTION SYSTEM WITH SQUARE TRANSDUCERS

TECHNICAL FIELD

This specification relates to systems and methods for in-line inspection of pipelines.

BACKGROUND

In-line inspection of pipelines can be used for evaluating the condition of a pipeline in support of pipeline integrity management. Ultrasonic in-line inspection has been used for monitoring wall thickness and for detecting cracks in pipelines carrying liquids.

SUMMARY

This specification describes technologies relating to ultrasonic, in-line pipeline inspection systems. The described approach incorporates square ultrasonic sensors onboard ultrasonic testing crack detection tools. These tools engineered and designed to accommodate modules with distributed ultrasonic testing sensors for detecting, locating and sizing axial and circumferential cracks. The number of modules and the number of ultrasonic testing sensors installed on the modules depend on the internal diameter (ID) of the pipe being inspected and orientation of the targeted cracks to provide 100% coverage of the pipe area from ID to outer diameter (OD).

Particular embodiments of the subject matter described in this specification can be implemented so as to realize one or more of the following advantages.

The described technology incorporating square ultrasonic transducers can provide an increase in inspection area coverage associated with the focal zone of the ultrasonic transducers relative to the coverage provided by circular ultrasonic transducers. By extending the length of the focal zone field by approximately 50%, this approach increases the probability of detection (PoD) and the accuracy of defect sizing capabilities of ultrasonic, in-line pipeline inspection tools. In addition, the increased focal zone length with enhanced crack detection capability can reduce the impact of crack orientations on defect detectability. Furthermore, the increase in focal zone length the same inspection tool can be used over a larger internal pipe diameter ranges.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is a flowchart of a method of detecting cracks in the wall of a pipeline.

Like reference numbers and designations in the various drawings indicate like elements.

DETAILED DESCRIPTION

This specification describes technologies relating to ultrasonic, in-line pipeline inspection systems. The described approach incorporates square ultrasonic sensors onboard ultrasonic testing crack detection tools. These tools engineered and designed to accommodate modules with distributed ultrasonic testing sensors for detecting, locating and sizing axial and circumferential cracks. The number of modules and the number of ultrasonic testing sensors installed on the modules depend on the internal diameter (ID) of the pipe being inspected and orientation of the targeted cracks to provide 100% coverage of the pipe area from ID to outer diameter (OD).

Figures 1, 2:
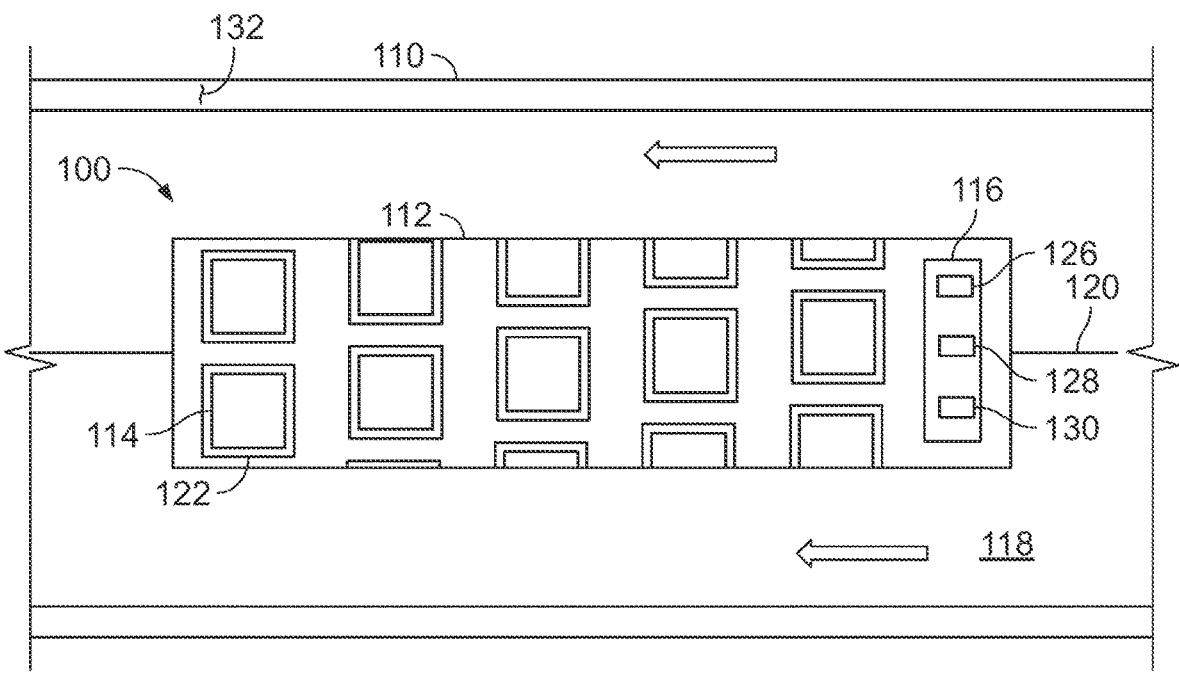
FIG. 1 is a schematic side view of an ultrasonic in-line pipeline inspection tool deployed in a pipeline.
FIG. 2 is a schematic cross-sectional view of the ultrasonic in-line pipeline inspection tool deployed in the pipeline.

FIG. 1 is a schematic side view of an ultrasonic pipeline inspection system 100 deployed in a pipeline 110. FIG. 2 is a schematic cross-sectional view of the ultrasonic in-line pipeline inspection system 100 deployed in the pipeline 110. The ultrasonic pipeline crack inspection system 100 includes a housing 112, square cross-section ultrasonic transducers 114, and a controller 116 operatively coupled to the plurality of square cross-section ultrasonic transducers 114.

The housing 112 is configured to be positioned within an internal volume defined by a pipeline flowing a liquid (e.g., oil) and having a circular cross-section. The liquid both transports the system 100 through the pipeline 110 and provides the medium through which ultrasonic energy is transmitted between the transducers 114 and the wall of the pipeline 110. The system has to be immersed in liquid to function (i.e., it will not function in gas or multiphase fluids).

The housing 112 is configured to travel axially within the internal volume along a longitudinal axis 120 of the pipeline 110. In the illustrated pipeline 110, oil 118 flowing from right to left in the pipeline 110 carries the housing 112 along the pipeline 110.

As best seen in FIG. 2, the housing 112 includes an elongated body with a circular cross-section smaller than the circular cross-section of the pipeline. A plurality of slots 122 are defined in a circumferential surface of the elongate body. Each of the square cross-section ultrasonic transducers 114 is positioned in one of the slots on the circumferential surface of the elongate body. The plurality of square cross-section ultrasonic transducers are configured to not directly contact the wall of the pipeline.

The ultrasonic transducers 114 are each oriented and configured to transmit an ultrasonic beam 124 away from the circumferential surface of the elongate body at an angle and configured to receive a reflection of the ultrasonic beam 124. Reflections of the angled beams can indicate where there are any surface breaking defects. The strongest reflection is obtained if the beam hits a crack at the corner where the crack is initiated from the surface so the transducers are typically set at a 45 degree refracted angle relative to the inside pipe wall.

The slots 122 and the ultrasonic transducers 114 are positioned to provide overlapping ultrasonic beams 124 with complete coverage of the wall of the pipeline 110. For clarity of illustration, only one of these ultrasonic beams is shown in FIG. 2. In some implementations, the ultrasonic transducers 114 include piezoelectric crystals used to generate the ultrasonic beams 124.

The sound generated from individual ultrasonic transducers 144 does not emanate from a single point but originates from the whole active surface (e.g., from a piezoelectric crystal) of the transducer. As the sound emanates from the active surface, the acoustic field intensity along the beam axis is affected by constructive and destructive wave interferences, which leads to extensive fluctuations in the intensity near the transducer. This is known as the near field 134.

The near field 134 for an ultrasonic transducer is a significant factor in controlling the POD, because the amplitude variations that characterize the near field starting to change to a smoothly declining amplitude at this point. The large intensity variations in near field 134 make it extremely difficult to accurately evaluate flaws in the wall of the pipeline 110 if the near field 134 covers the wall. The area beyond the near field 134 where the ultrasonic wave is well behaved and is of maximum strength is known as far field 136. In the far field 136, the ultrasonic beam intensity is relatively uniform.

The ultrasonic beam 124 transmitted by each square cross-section ultrasonic transducer 114 includes an ultrasonic beam profile with a substantially cylindrical focal spot or zone 138. The square cross-section ultrasonic transducer 114 can be oriented such that a corresponding focal spot zone 138 of each square cross-section UT forms in the wall of the pipeline 110.

The controller 116 includes one or more processors 126 and a non-transitory computer-readable medium 128. The non-transitory computer-readable medium 128 stores instructions which, when executed by the one or more processors 126, cause the one or more processors 126 to perform operations including: causing each ultrasonic transducer 114 to transmit a respective ultrasonic beam 124 through the fluid 118 in the pipeline 110 towards a wall of the pipeline 110, receiving a respective reflection of each ultrasonic beam 124 transmitted by each square cross-section ultrasonic transducer 114, and processing each respective ultrasonic beam 124 and each respective reflection of each ultrasonic beam 124 to analyze a crack 132 in the wall of the pipeline.

The controller 116 also includes systems for transferring data including but not limited to pulsers, pre-amplifiers, signal generators/recorders, data storage capabilities for onboard as well as offline processing capabilities, encoders & localization mechanisms for patching the received data on different pipe location. The whole inspection process is automated and work in sync with encoder to provider 100% inspection coverage, with both circumferential & axial localization capabilities. The data can be processed and stored onboard, and retrieved when the tool has completed the in section run, or the processing can be done offline on the pre-stored inspection run data.

Figure 3:
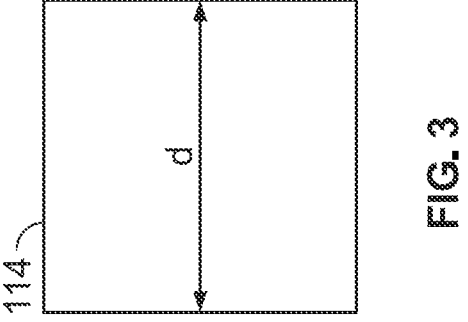
FIG. 3 is a schematic front view of an ultrasonic transducer.

FIG. 3 is a schematic front view of one of the ultrasonic transducers 114 with maximum dimension d. The entire cross-sectional face of each of the ultrasonic transducers 114 transmits ultrasonic energy to form the ultrasonic beams. In these implementations, square cross-section ultrasonic transducers have almost 30% more surface area than a circular transducer with the same maximum dimension.

Figure 4B:
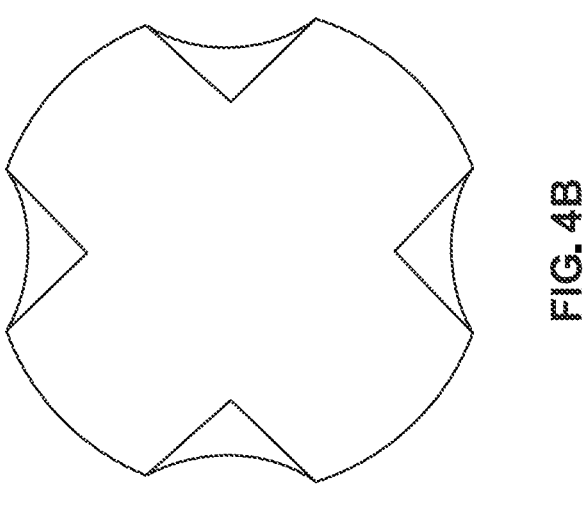
FIGS. 4A and 4B illustrate the hypothetical shape of ultrasonic intensity at/or near the focal point for a square transducer.
Figure 4A:
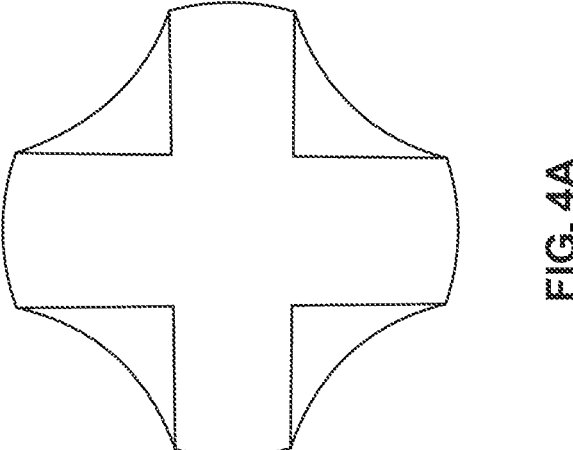

FIGS. 4A and 4B illustrate the hypothetical shape of ultrasonic intensity at/or near the focal point for a square transducer. As illustrated, the field associated to diagonal dimensions is contracted inwards (FIG. 4A) or expanded outwards (FIG. 4B), depending on the axial position.

This feature is important because inspection and localization of defects depends on the spatial resolution of the inspection system. The spatial resolution is the ability of the inspection system to distinguish between defects at different positions in space. Spatial resolution is divided into two components, axial and lateral resolution. The axial resolution is the ability to distinguish between the signals originating from two reflectors lying along the axis of the ultrasonic beam (also referred as depth resolution), whereas the lateral resolution is the ability to distinguish between two reflectors situated side by side in a direction perpendicular to that of ultrasonic beam. PoD is directly related to axial resolution whereas the sizing capability of the inspection system depends on the lateral resolution.

By using square transducers in the inspection system, the ultrasonic beam profile is not axially symmetric, with slightly more pointed characteristics than a circular transducer of the same dimensions. As illustrated in FIG. 2, this provides a focal spot with a non-symmetrical cylindrical shape, which starts before N, and extended further with the influence of diagonal dimension of the square shape. The cross-section of this cylinder will not be a perfect circle but a shape with inward contractions or outward expansions of ultrasonic intensity in the diagonal dimensions as shown in FIGS. 4A and 4B.

Figure 5:
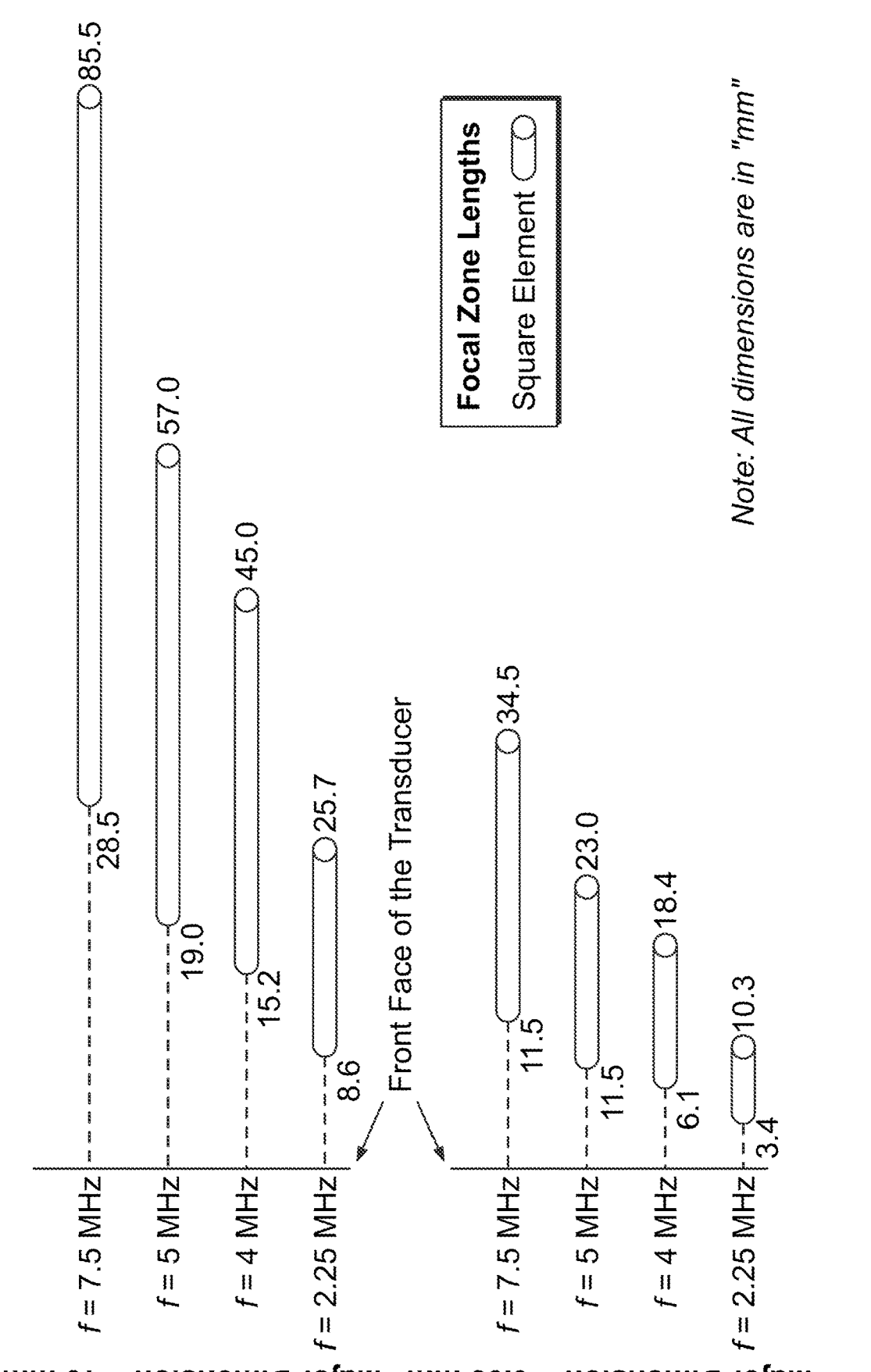
FIG. 5 illustrates the focal zone lengths for 6.35 millimeter (mm) and 10 mm diameter square element transducers for different ultrasonic frequencies.

FIG. 5 illustrates the focal zone lengths for 6.35 mm and 10 mm diameter square element transducers for different ultrasonic frequencies. Using square cross-section ultrasonic transducers, increases the focal zone length and also moves the zone away from the transducer face and farther into the inspection zone. The elongation and the axial movement away of the focal zone can provide increases PoD and enhances sizing capability of inspection systems due to a longer region of less divergent ultrasonic beam.

FIG. 6 is a flowchart of a method 200 of detecting cracks in the wall of a pipeline. The method includes positioning an ultrasonic pipeline crack inspection system within an internal volume defined by a pipeline flowing a fluid and having a circular cross-section (step 210). The system includes: an elongate body with a circular cross-section smaller than the circular cross-section of the pipeline, a plurality of slots on a circumferential surface of the elongate body, and a plurality of square cross-section ultrasonic transducers positioned in the corresponding plurality of slots on the circumferential surface of the elongate body.

As the system moves through the pipeline, each square cross-section ultrasonic transducers transmits an ultrasonic beam (e.g., an ultrasonic beam generated using a piezoelectric crystal) away from the circumferential surface of the elongate body into a wall of the pipeline (step 212). The ultrasonic beam transmitted by each square cross-section ultrasonic transducer includes an ultrasonic beam profile with a substantially cylindrical focal spot. In these implementations, the method further includes orienting each square cross-section ultrasonic transducers such that a corresponding focal spot of each square cross-section ultrasonic transducers forms in the wall of the pipeline. In some implementations, transmitting the ultrasonic beam includes transmitting the ultrasonic beam without directly contacting the wall of the pipeline (e.g., transmitting the ultrasonic beam using the fluid flowing within the pipeline as a medium).

Each square cross-section ultrasonic transducers has a cross-sectional area. In some implementations, transmitting the ultrasonic beam includes transmitting the ultrasonic beam from an entirety of the cross-sectional area.

Reflections of the ultrasonic beams are received by each square cross-section ultrasonic transducers (step 214). Each respective ultrasonic beam and each respective reflection of each ultrasonic beam is processed to analyze a crack in the wall of the pipeline (step 216). In some implementations, processing each respective ultrasonic beam and each respective reflection of each ultrasonic beam to analyze the crack in the wall of the pipeline includes determining a probability of detection of the crack in the wall of the pipeline and/or determining a size of the crack in the wall of the pipeline.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Particular embodiments of the subject matter have been described. Other embodiments are within the scope of the following claims.

For example, in the illustrated system, the ultrasonic transducers 114 and the controller 116 are incorporated into a single tool. However, the components of some ultrasonic pipeline inspection systems are distributed between multiple tools (e.g., a sensor module connected by cables with a control module).

In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Examples

In an example aspect, an ultrasonic pipeline crack inspection system includes: a housing configured to be positioned within an internal volume defined by a pipeline flowing a fluid and having a circular cross-section, the housing configured to travel axially within the internal volume along a longitudinal axis of the pipeline. The housing includes: an elongate body with a circular cross-section smaller than the circular cross-section of the pipeline and a plurality of slots on a circumferential surface of the elongate body. A plurality of square cross-section ultrasonic transducers are positioned in the corresponding the plurality of slots on the circumferential surface of the elongate body, each square cross-section UT oriented and configured to transmit an ultrasonic beam away from the circumferential surface of the elongate body and configured to receive a reflection of the ultrasonic beam. A controller is operatively coupled to the plurality of square cross-section UTs and includes: one or more processors, and a non-transitory computer-readable medium storing instructions which, when executed by the one or more processors, cause the one or more processors to perform operations including: causing each UT of the plurality of square cross-section UTs to transmit a respective ultrasonic beam through the fluid flowed through the pipeline towards a wall of the pipeline, receiving, through the fluid flowed through the pipeline, a respective reflection of each ultrasonic beam transmitted by each square cross-section UT, and processing each respective ultrasonic beam and each respective reflection of each ultrasonic beam to analyze a crack in the wall of the pipeline.

In an example aspect combinable with any other example aspect, an ultrasonic beam transmitted by each square cross-section UT includes an ultrasonic beam profile with a substantially cylindrical focal spot, wherein each square cross-section UT is oriented such that a corresponding focal spot of each square cross-section UT forms in the wall of the pipeline.

In an example aspect combinable with any other example aspect, processing each respective ultrasonic beam and each respective reflection of each ultrasonic beam to analyze the crack in the wall of the pipeline includes determining a probability of detection of the crack in the wall of the pipeline. Processing each respective ultrasonic beam and each respective reflection of each ultrasonic beam to analyze the crack in the wall of the pipeline can include determining a size of the crack in the wall of the pipeline.

In an example aspect combinable with any other example aspect, the plurality of square cross-section UTs are configured to not directly contact the wall of the pipeline.

In an example aspect combinable with any other example aspect, each square cross-section UT includes a cross-sectional area, wherein the ultrasonic beam is configured to be transmitted from an entirety of the cross-sectional area. The ultrasonic beam can be generated using a piezoelectric crystal.

In an example aspect combinable with any other example aspect, a method includes: positioning an ultrasonic pipeline crack inspection system within an internal volume defined by a pipeline flowing a fluid and having a circular cross-section; transmitting, by each square cross-section UT, an ultrasonic beam away from the circumferential surface of the elongate body into a wall of the pipeline; receiving, by each square cross-section UT, a reflection of the ultrasonic beam; and processing each respective ultrasonic beam and each respective reflection of each ultrasonic beam to analyze a crack in the wall of the pipeline.

In an example aspect combinable with any other example aspect, methods include orienting each square cross-section UT such that a corresponding focal spot of each square cross-section UT forms in the wall of the pipeline.

In an example aspect combinable with any other example aspect, processing each respective ultrasonic beam and each respective reflection of each ultrasonic beam to analyze the crack in the wall of the pipeline includes determining a probability of detection of the crack in the wall of the pipeline. Processing each respective ultrasonic beam and each respective reflection of each ultrasonic beam to analyze the crack in the wall of the pipeline comprises determining a size of the crack in the wall of the pipeline.

In an example aspect combinable with any other example aspect, transmitting, by each square cross-section UT, the ultrasonic beam includes transmitting the ultrasonic beam without directly contacting the wall of the pipeline, e.g., transmitting the ultrasonic beam using the fluid flowing within the pipeline as a medium.

In an example aspect combinable with any other example aspect, each square cross-section UT includes a cross-sectional area, wherein transmitting the ultrasonic beam comprises transmitting the ultrasonic beam from an entirety of the cross-sectional area and/or generating the ultrasonic beam using a piezoelectric crystal.

What is claimed is:

1. An ultrasonic pipeline crack inspection system comprising:

a housing configured to be positioned within an internal volume defined by a pipeline flowing a fluid and having a circular cross-section, the housing configured to travel axially within the internal volume along a longitudinal axis of the pipeline, the housing comprising:

an elongate body with a circular cross-section smaller than the circular cross-section of the pipeline, and a plurality of slots on a circumferential surface of the elongate body, the plurality of slots comprising:

a first set of slots positioned at a first axial length along a longitudinal axis of the housing, and a second set of slots positioned at a second axial length along the longitudinal axis of the housing, the second axial length different than the first axial length, the second set of slots offset angularly from the first set of slots relative to the longitudinal axis of the housing;

a plurality of square cross-section ultrasonic transducers (UTs) positioned in the plurality of slots on the circumferential surface of the elongate body, each square cross-section UT oriented and configured to transmit an ultrasonic beam away from the circumferential surface of the elongate body and configured to receive a reflection of the ultrasonic beam; wherein the ultrasonic beam transmitted by each square cross-section UT includes an ultrasonic beam profile with a cylindrical focal spot comprising inward contractions and outward expansions, wherein each square cross-section UT is oriented such that a corresponding focal spot of each square cross-section UT forms in the wall of the pipeline; and a controller operatively coupled to the plurality of square cross-section UTs, the controller comprising:

one or more processors, and a non-transitory computer-readable medium storing instructions which, when executed by the one or more processors, cause the one or more processors to perform operations comprising:

causing each UT of the plurality of square cross-section UTs to transmit a respective ultrasonic beam through the fluid flowed through the pipeline towards a wall of the pipeline, receiving, through the fluid flowed through the pipeline, a respective reflection of each ultrasonic beam transmitted by each square cross-section UT, and processing each respective ultrasonic beam and each respective reflection of each ultrasonic beam to analyze a crack in the wall of the pipeline.

2. The system of claim 1, wherein processing each respective ultrasonic beam and each respective reflection of each ultrasonic beam to analyze the crack in the wall of the pipeline comprises determining a probability of detection of the crack in the wall of the pipeline.

3. The system of claim 2, wherein processing each respective ultrasonic beam and each respective reflection of each ultrasonic beam to analyze the crack in the wall of the pipeline comprises determining a size of the crack in the wall of the pipeline.

4. The system of claim 1, wherein the plurality of square cross-section UTs are configured to not directly contact the wall of the pipeline.

5. The system of claim 1, wherein each square cross-section UT includes a cross-sectional area, wherein the ultrasonic beam is configured to be transmitted from an entirety of the cross-sectional area.

6. The system of claim 5, wherein the ultrasonic beam is generated using a piezoelectric crystal.

7. A method comprising:

positioning an ultrasonic pipeline crack inspection system within an internal volume defined by a pipeline flowing a fluid and having a circular cross-section, the system comprising:

an elongate body with a circular cross-section smaller than the circular cross-section of the pipeline, a plurality of slots on a circumferential surface of the elongate body, the plurality of slots comprising:

a first set of slots positioned at a first axial length along a longitudinal axis of the elongate body; and a second set of slots positioned at a second axial length along the longitudinal axis of the elongate body, the second axial length different than the first axial length, the second set of slots offset angularly from the first set of slots relative to the longitudinal axis of the elongate body, and a plurality of square cross-section ultrasonic transducers (UTs) positioned in the plurality of slots on the circumferential surface of the elongate body;

transmitting, by each square cross-section UT, an ultrasonic beam away from the circumferential surface of the elongate body into a wall of the pipeline; the ultrasonic beam transmitted by each square cross-section UT includes an ultrasonic beam profile with a cylindrical focal spot comprising inward contractions and outward expansions, wherein the method further comprises orienting each square cross-section UT such that a corresponding focal spot of each square cross-section UT forms in the wall of the pipeline;

receiving, by each square cross-section UT, a reflection of the ultrasonic beam; and processing each respective ultrasonic beam and each respective reflection of each ultrasonic beam to analyze a crack in the wall of the pipeline.

8. The method of claim 7, wherein processing each respective ultrasonic beam and each respective reflection of each ultrasonic beam to analyze the crack in the wall of the pipeline comprises determining a probability of detection of the crack in the wall of the pipeline.

9. The method of claim 8, wherein processing each respective ultrasonic beam and each respective reflection of each ultrasonic beam to analyze the crack in the wall of the pipeline comprises determining a size of the crack in the wall of the pipeline.

10. The method of claim 7, wherein transmitting, by each square cross-section UT, the ultrasonic beam comprises transmitting the ultrasonic beam without directly contacting the wall of the pipeline.

11. The method of claim 10, further comprising transmitting the ultrasonic beam using the fluid flowing within the pipeline as a medium.

12. The method of claim 7, wherein each square cross-section UT includes a cross-sectional area, wherein transmitting the ultrasonic beam comprises transmitting the ultrasonic beam from an entirety of the cross-sectional area.

13. The method of claim 12, further comprising generating the ultrasonic beam using a piezoelectric crystal.

* * * * *